Dec. 28, 1943.   J. AKINS   2,337,957
PIPE MARKING AND CUTTING GAUGE
Filed April 22, 1942
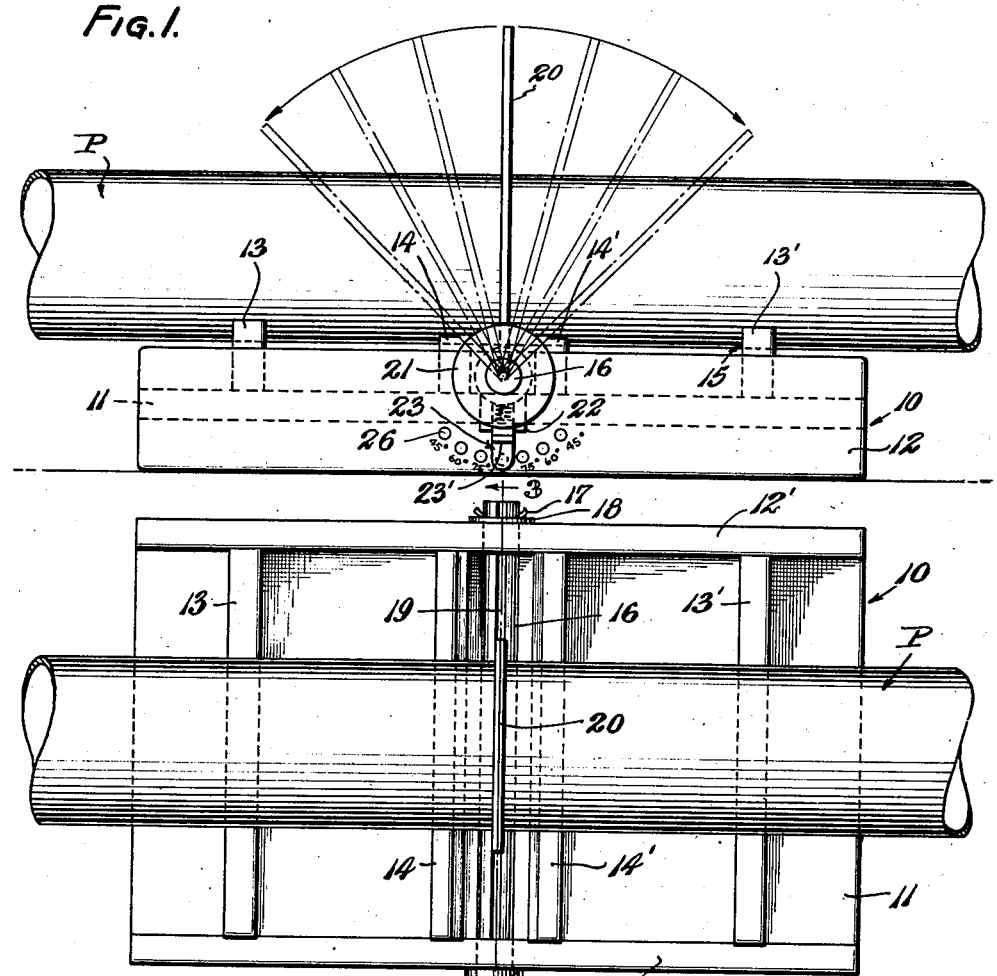
Fig. 1.
Fig. 2.
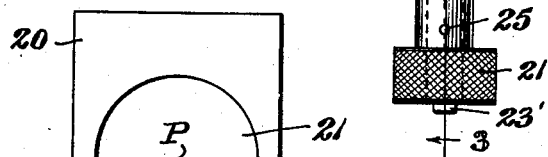
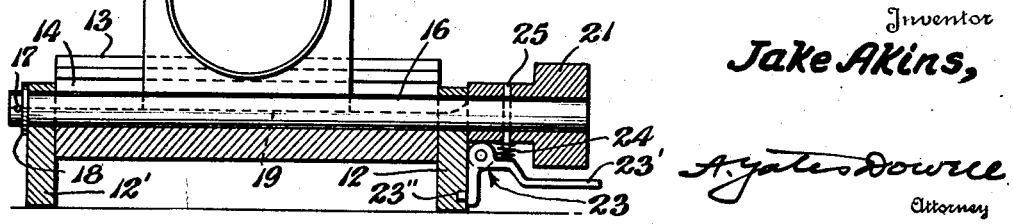
Fig. 3.
Inventor
Jake Akins,
Attorney Patented Dec. 28, 1943

2,337,957

UNITED STATES PATENT OFFICE 2,337,957

PIPE MARKING AND CUTTING GAUGE

Jake Akins, Statesboro, Ga., assignor of one-half to Alfred A. Dorman, Statesboro, Ga.

Application April 22, 1942, Serial No. 440,105

12 Claims. (Cl. 29—67)

This invention relates to a pipe cutting marker or gauge of that type used primarily in cutting pipe lengths on an angle for the purpose of producing elbows and like angular shapes.

Devices of this general type as heretofore proposed have had little demand in the trade, due apparently to their complex nature, cost in construction and awkwardness in use. Ofttimes workers are called upon to cut pipe at an angle who are not necessarily skilled in this particular line of work, and it is therefore important that the marker be not only easy to use but that it hold the pipe definitely in a position such as will afford a clear line of cut. This not only holds true with respect to employees of limited experience but also with respect to tinsmiths and others who work in this field.

The present invention therefore includes among its objects:

To provide a pipe cutting marker or gauge of simple construction yet at the same time capable of producing exact work and which may be readily operated by both skilled and unskilled workers;

To provide a device of this type which will serve as a support for the pipe while the latter is being marked for the cut and which will permit the pipe to lie in a convenient working position while being so marked;

To provide a pipe cutting marker or gauge which will not only facilitate marking for the cut but which may also be used as a jig or fixture for holding the pipe during the cutting operation;

And to simplify at the same time generally improved devices of this type.

The foregoing and other objects and advantages will become apparent in view of the following description taken in conjunction with the drawing, wherein:

Fig. 1 is a view in side elevation of a pipe cutting marker or gauge in accordance with the invention;

Fig. 2 is a top plan view of Fig. 1; and,

Fig. 3 is a section taken substantially on the line 3—3 of Fig. 2.

Referring to the drawing in detail, the improved pipe cutting marker or gauge comprises a base, generally indicated at 10, made up of a bottom or base board 11, side frame members 12 and 12' and cross pieces 13, 13' and 14, 14', the said cross pieces being formed with arcuate recesses 15 defining a bed for the pipe to be marked and indicated at P in the drawing.

A shaft 16 is projected transversely through the side frame members 12 and 12' and has bearing at opposite ends in the latter, said shaft being removably held in assembled position by means such as a cotter key 17 and thrust washer or bearing 18. This shaft 16 is formed with a longitudinal groove 19 adapted to receive any one of a plurality of marking dies 20 having an elongated oval shaped opening 21 therein through which the pipe is projected. These marking dies 20 are preferably of flat shape and there are usually a plurality of the said dies furnished with each marker. The pipe-receiving opening 21 in each die is of a size such as will cause the side walls of the opening to engage a certain diameter or size of pipe relatively snugly but having sufficient clearance above and below the pipe to permit the die to be swung to varying angles with respect to the pipe. The lower edge of the die is adapted to engage in the groove 19 so that the die is held in a relatively rigid position with respect to the shaft 16 and at the same time may be easily and quickly removed from the groove 19 and substituted by another die. Material from which the die is made may be of various kinds, such as wood, composition, plastics, and the like. It is preferred, however, that the material be rigid and of sufficient strength to form a support and guide not only for a marking tool but also for a cutting tool.

The outer end of the shaft 16 has removably secured thereon a knob or handle 21, and this knob carries a bracket 22 which serves to mount an indexing member, generally indicated at 23, said member being in the form of bell crank lever having a handle 23' and a pawl or dog 23", the handle being depressed against the resistance of a spring 24 mounted over the lower projecting end of a pin 25, which latter also serves to hold the knob 21 on the shaft 16. The dog 23" is adapted to engage in any one of a plurality of holes 26, note particularly Fig. 1, formed in the outer side of the frame member 12, said holes being arranged in an arcuate path and being calibrated in degrees to indicate the angle of cut.

In operation, a marking die 20 is inserted in the groove 19 of the shaft 16 and the length of pipe to be cut inserted through the opening 21 of said die and rests on the bed defined by the arcuate recesses 15 of the cross members 13, 13', 14, 14'. The knob 21 is then grasped by the operator and the handle 23' depressed to permit the shaft carrying the die to be swung to the desired angle of cut, whereupon the handle is released permitting the dog 23" to engage in any one of the calibrated holes 26. The die is now held positively and rigidly in place so that the pipe may be removed during the cutting operation or it may remain in place and the die used as a support and guide for the cutting tool.

It will be noted that the cross members 14, 14' serve as a stabilizing support for the die when the latter is swung to an angle of 45°, which is the angle most commonly used for elbow joints.

The simplicity in operation and construction of the device will be obvious. It may be made from wood or any other suitable material, and may be taken apart and arranged in a compact bundle for shipment or storage. The base or main frame of the device forms a stable support for the pipe and permits the latter to be disposed horizontally and which is generally the most convenient position for marking and cutting pipe. The parts are particularly adapted for low cost production on a volume basis.

It will be understood that certain limited changes in construction and design of the improved marking and cutting gauge may be made without departing from the spirit or scope of the invention as defined by the appended claims.

What is claimed is:

1. A pipe marking and cutting gauge comprising a main frame defining a bed for supporting on its side the pipe to be marked, a rotatable member journaled in said frame the axis of which is transverse to and outside said pipe, a pipe marking die carried by said member, said die being formed with an elongated opening of a size such as to permit the die to assume one or more angular positions with respect to the pipe inserted through said opening, said member being rotatable to swing the die to the desired position of use.

2. A pipe marking and cutting gauge comprising a main frame defining a support for the pipe on its side to be marked, a rotatable member journaled in said frame the axis of which is transverse to and outside said pipe, a pipe marking die having an opening therein of the size to permit clearance above and below the pipe so that the die may be swung to different angular positions with respect to the pipe, said die having a substantially flat marking and guiding face, said member being rotatably to swing the die to the desired angle of use, and means for positively locking said member against rotation to thereby hold the die in a selected position.

3. A pipe marking and cutting gauge comprising a main frame including a base, side members and cross connecting members, said cross connecting members being formed with arcuate recesses defining a bed for the pipe to be marked, a shaft projected through said side members over said base and formed with an elongated slot therein, a marking die having an opening for receiving the pipe, said opening being of elongated contour to permit the die to be swung to one or more angular positions with respect to the pipe, the lower edge of the die being adapted for insertion in said groove, said shaft being rotatable to swing the die to the desired position of use, and means for locking the shaft against rotation to thereby hold the die in a selected position.

4. A pipe marking and cutting gauge comprising a main frame defining a bed for supporting the pipe to be marked, a rotatable member journaled in said frame and extending across the latter beneath the pipe bed, said member having an elongated groove therein, a pipe marking die having an opening of a size to receive the pipe and permit the die to assume different angular positions with respect to the pipe, said die at its lower edge being adapted to engage in said groove, said rotatable member being rotated to move the die to its desired angle of use, and means for locking said rotatable member against rotation to hold the die in its selected position.

5. A pipe marking and cutting gauge comprising a base frame having side members, a shaft rotatably journaled in said side members, said base frame providing a rest for the pipe to be cut, said shaft being formed with an elongated groove, a substantially flat-faced marking die adapted at its lower edge to be inserted in said groove, said die being formed with an opening for receiving the pipe to be cut, said opening being elongated to permit rotative movement of the die to a plurality of angular positions relative to the pipe, said shaft being rotated to move the die to the desired angular position to facilitate marking and cutting of the pipe, and means for locking said shaft against rotation to hold the die in such position.

6. A pipe marking and cutting device comprising a main frame defining a rest for the pipe to be marked and cut, a rotatable member journaled in said frame and formed with an elongated groove, a substantially flat-faced pipe-marking die having its lower edge constructed for removable engagement in said groove, said die being formed with an elongated opening to receive the pipe and of a size such as to permit the die to be swung to one or more angular positions with respect to the pipe, a handle for said rotatable member, and releasable locking means associated with said handle for locking the rotatable member against rotation to hold the die in any selected position of use.

7. A pipe marking and cutting device comprising a main frame defining a bed for supporting the pipe to be marked and cut, a rotatable member journaled in said frame and having a portion extending across said bed, a pipe marking die formed with an elongated opening for receiving the pipe to be marked and cut, said opening being of a size permitting the die to be swung to one or more angular positions with respect to the pipe, the lower edge of said die and said rotatable member being formed with coacting engaging means whereby the die may be removably connected to said member, a handle secured on the outer end of said rotatable member, and latch means associated with said handle for locking the rotatable member against rotation to hold the die in any selected position of use.

8. A pipe marking and cutting gauge comprising a main frame having a base portion and upright side members, cross pieces connecting said side members and formed with arcuate recesses defining a bed for the pipe to be marked, a shaft journaled at its opposite ends in said side members, the intermediate portion of the shaft projecting across said bed, a substantially flat-faced pipe-marking die formed with an elongated opening to receive the pipe to be marked and cut, said opening being of a size such as will permit the die to be swung to different angular positions with respect to the pipe, the lower edge of said die and said shaft being formed with coacting means whereby the die may be removably associated with the shaft, the outer end of said shaft being provided with a handle, and a latch associated with said handle for locking the shaft against rotation to hold the die in any selected position of use.

9. A pipe marking gauge comprising a frame for supporting a pipe on its side, a rotatable member extending across said frame the axis of which is transverse to and outside said pipe, a pipe marking die connected to said member and formed with an opening for receiving the pipe to be marked, said opening being of a contour such as will permit the die to assume different angular positions with respect to the pipe, said rotatable member being rotated to swing the die to the desired angular position of use, and means for locking said rotatable member against rotation to hold the die in such position.

10. A pipe marking and cutting device comprising a frame for supporting a pipe on its side, a rotatable member journaled in said frame the axis of which is transverse to and outside said pipe, a pipe marking die connected to said member and formed with an opening to receive the pipe to be marked and cut, said opening being of a contour such as will permit the die to assume different angular positions with respect to the pipe, a latch assembly associated with said rotatable member and frame and including a locking dog adapted to engage in any selected one of a plurality of arcuately arranged detents or holes to lock the rotatable member against rotation, said detents or holes being calibrated in degrees indicating the angle assumed by said die.

11. In a device for marking and cutting pipe lengths to provide accurate elbow joints, a main supporting frame for supporting a pipe on its side, a rotatable member journaled in said frame the axis of which is transverse to and outside said pipe, a marking die having an opening therethrough to receive a pipe length, means connecting the lower edge of said die to said member whereby the die may be swung to different angular positions, the opening in the die being contoured to give clearance above and below the pipe to permit the die to be positioned at an angle with respect to the pipe, and means on said frame for positively limiting the extreme angular position of the die with respect to the pipe.

12. A pipe marking and cutting gauge comprising a bed for supporting a pipe in a substantially horizontal position, a pivotally mounted member carried by said bed transversely of the same and of the position of the pipe to be marked, said pivotally mounted member having its pivotal axis offset from the axis of the pipe, and a pipe marking die adapted to be carried by said pivotally mounted member and having an oval recess for receiving the pipe and permitting the marking die to be swung to change its angular position.

JAKE AKINS.